US012772347B2

(12) United States Patent
Acevedo Simon et al.

(10) Patent No.: US 12,772,347 B2
(45) Date of Patent: Oct. 20, 2026

(54) DOMESTIC APPLIANCE DEVICE AND METHOD FOR OPERATING A DOMESTIC APPLIANCE DEVICE

(71) Applicant: BSH Hausgeräte GmbH, Munich (DE)

(72) Inventors: Arturo Acevedo Simon, Saragossa (ES); Nicolas Blasco Rueda, Saragossa (ES); Carlos Calvo Mestre, Saragossa (ES); Cristina Diez Esteban, Saragossa (ES); Diego Puyal Puente, Saragossa (ES)

(73) Assignee: BSH Hausgeräte GmbH, Munich (DE)

( * ) Notice: Subject to any disclaimer, the term of this patent is extended or adjusted under 35 U.S.C. 154(b) by 852 days.

(21) Appl. No.: 18/021,209

(22) PCT Filed: Aug. 2, 2021

(86) PCT No.: PCT/EP2021/071533
§ 371 (c)(1),
(2) Date: Feb. 14, 2023

(87) PCT Pub. No.: WO2022/048838
PCT Pub. Date: Mar. 10, 2022

(65) Prior Publication Data
US 2023/0328852 A1 Oct. 12, 2023

(30) Foreign Application Priority Data
Sep. 2, 2020 (EP) .................................... 20382782

(51) Int. Cl.
*H05B 6/06* (2006.01)
*H05B 6/12* (2006.01)

(52) U.S. Cl.
CPC .................................... *H05B 6/065* (2013.01)

(58) Field of Classification Search
CPC ...... H05B 6/062; H05B 6/065; B60G 17/017; B60G 17/052; B60G 2206/911; B60G 2300/38; B60G 2500/30; B60K 1/04; B60K 2001/0438; B60K 2001/0461; B60K 2001/0466; B60K 2001/0472; B60K 2001/0488; B60K 2001/0494; B60K 6/28;
(Continued)

(56) References Cited

U.S. PATENT DOCUMENTS 9,572,202 B2 2/2017 Viroli
10,873,994 B2 * 12/2020 Nam ....................... G05F 1/153
(Continued)

FOREIGN PATENT DOCUMENTS

WO WO-2007048700 A1 * 5/2007 ............... H05B 6/04

OTHER PUBLICATIONS

International Search Report PCT/EP2021/071533 dated Oct. 15, 2021.

*Primary Examiner* — Quang T Van
(74) *Attorney, Agent, or Firm* — Michael E. Tschupp; Andre Pallapies; Brandon G. Braun

(57) ABSTRACT

A household appliance apparatus includes a first inverter, a second inverter, a first phase terminal designed for electrical connection to a first phase of a power supply network, a second phase terminal designed for electrical connection to a second phase of the power supply network, and a switching arrangement configured to assign each of the first and second inverters to each of the first and second phase terminals.

19 Claims, 7 Drawing Sheets

(58) Field of Classification Search
CPC . B60L 50/66; B60Y 2200/91; B60Y 2200/92; H01M 10/0525; H01M 10/613; H01M 10/625; H01M 2200/00; H01M 2220/20; H01M 50/209; H01M 50/211; H01M 50/213; H01M 50/224; H01M 50/24; H01M 50/244; H01M 50/262; H01M 50/298; H01M 50/383; H01M 50/394; H01M 50/505; H01M 50/51; Y02E 60/10; Y02T 10/70; Y10T 29/49716; Y10S 903/907
USPC ....... 219/620, 622, 624, 625, 626, 627, 628, 219/660, 661, 662, 663, 665, 666, 667, 219/669, 489, 443.1, 448.11
See application file for complete search history.

(56) References Cited

U.S. PATENT DOCUMENTS

2011/0147375 A1 6/2011 Lomp
2017/0223780 A1* 8/2017 Heo .................... H05B 6/1209
2019/0394837 A1 12/2019 Yun

* cited by examiner

DOMESTIC APPLIANCE DEVICE AND METHOD FOR OPERATING A DOMESTIC APPLIANCE DEVICE

CROSS-REFERENCES TO RELATED APPLICATIONS

This application is the U.S. National Stage of International Application No. PCT/EP2021/071533, filed Aug. 2, 2021, which designated the United States and has been published as International Publication No. WO 2022/048838 A1 and which claims the priority of European Patent Application, Serial No. 20382782.9, filed Sep. 2, 2020, pursuant to 35 U.S.C. 119 (a)-(d).

The contents of International Application No. PCT/EP2021/071533 and European Patent Application, Serial No. 20382782.9 are incorporated herein by reference in their entireties as if fully set forth herein.

BACKGROUND OF THE INVENTION

The invention relates to a household appliance apparatus, in particular a cooktop apparatus, a household appliance having a household appliance apparatus and a method for operating a household appliance apparatus.

A cooktop having two inverters and having a phase terminal for electrical connection to one phase of a power supply network is already known from the prior art, wherein the two inverters are permanently assigned to one phase terminal.

BRIEF SUMMARY OF THE INVENTION

The object of the invention, in particular but not limited thereto, is to provide a generic household appliance apparatus which has improved properties regarding flexibility.

The invention is based on a household appliance apparatus, in particular a cooktop apparatus, having a first inverter, having a second inverter; having a first phase terminal which is provided for electrical connection to a first phase of a power supply network, and having a second phase terminal which is provided for electrical connection to a second phase of the power supply network.

It is proposed that the household appliance apparatus has at least one switching arrangement, by means of which each of the inverters is able to be assigned to each of the phase terminals.

In particular a household appliance apparatus, in particular a cooktop apparatus, which has improved properties regarding flexibility can be provided by means of such an embodiment. In particular, a more flexible distribution, in particular a more flexible distribution of a power, and namely in particular of a heating power, can be provided by means of such an embodiment. Moreover, in particular, a high degree of modularity of the household appliance apparatus can be ensured. Moreover, a power, in particular electrical power, consumed by units and/or components of the household appliance apparatus can be distributed more uniformly by means of such an embodiment. Moreover, in particular, a high level of efficiency, in particular a high level of cost efficiency, can be achieved and namely in particular relative to the required components and/or a required number of components. In particular, at least one additional functionality and/or more flexible functionality of the household appliance apparatus can be provided in a cost-efficient manner. In particular, an operation of a boost mode, in particular in a bridge heating zone of the household appliance apparatus, can be permitted. In particular, a power density can be increased in a boost mode, in particular relative to the bridge heating zone. Moreover, in particular, a maximum possible operating period can be extended in a boost mode, in particular since critical parts and/or components can be protected in an improved manner by means of such an embodiment. Moreover, improved properties regarding ease of use can be achieved, in particular for a user of the household appliance apparatus, and namely in particular by reducing intermodulation noise. Moreover, improved properties can be achieved regarding a control of the household appliance apparatus, and namely in particular relative to a more flexible control of the household appliance apparatus. In particular, a user perception can also be improved and namely, in particular, regarding a power provided by the household appliance apparatus in any operating state of the household appliance apparatus and namely, in particular, by a power density being able to be improved by such an embodiment.

The household appliance apparatus could be, for example, an oven apparatus, advantageously a cooktop apparatus, and particularly advantageously an induction cooktop apparatus. A "household appliance apparatus", in particular an "oven apparatus", advantageously a "cooktop apparatus", and particularly advantageously an "induction cooktop apparatus", are intended to be understood to mean at least one part, in particular a subassembly, of a household appliance, in particular a cooking appliance, advantageously a cooktop, and particularly advantageously an induction cooktop. A household appliance having the household appliance apparatus could be, for example, an oven and/or a microwave and/or a grill appliance and/or a steam cooking appliance. Preferably, the household appliance having the household appliance apparatus is a cooking appliance. Advantageously, a household appliance configured as a cooking appliance is a cooktop and preferably an induction cooktop. A "cooktop apparatus", in particular an "induction cooktop apparatus", is intended to be understood to mean, at least a part, in particular a subassembly, of a cooktop, in particular an induction cooktop, wherein in particular accessories for the cooktop, such as for example a sensor unit for the external measurement of a temperature of an item of cookware and/or a food to be cooked, can also be encompassed therein. In particular, the cooktop apparatus, in particular the induction cooktop apparatus, can also comprise the entire cooktop, in particular the entire induction cooktop.

An "inverter" is intended to be understood to mean a unit which in at least one operating state provides an alternating current, in particular a high frequency alternating current, in particular at a frequency of at least 10 kHz, preferably of at least 20 kHz and in particular of a maximum of 100 kHz, for at least one further unit, in particular for at least one heating unit of the household appliance apparatus. In particular, the inverter can have inverter switching elements which, in particular, can be configured as an IGBT, MOSFET, HEMT, JFET and/or as a TRIAC. In particular, the inverter switching elements can be at least partially formed from semiconductor material, such as for example silicon, silicon carbide and/or gallium nitride and/or from a different semiconductor material appearing expedient to a person skilled in the art.

The first phase terminal and/or the second phase terminal have at least two terminal contacts for connecting to one of the phases. In particular, all of the phase terminals of the household appliance apparatus have at least two terminal contacts.

In each case, one of the at least two terminal contacts of each phase terminal is provided for electrical connection, and advantageously additionally for mechanical connection, to an external conductor which is different from a neutral conductor, in particular an external conductor known to a person skilled in the art as L1 or L2 or L3, of an alternating current network, advantageously a multi-phase house connection, in particular a three-phase house connection. Additionally, one of the at least two terminal contacts of each phase terminal is provided for electrical connection, and advantageously additionally for mechanical connection, to a neutral conductor of the alternating current network, advantageously of the multi-phase house connection, in particular of the three-phase house connection.

A "switching arrangement" is intended to be understood to mean an electrical unit which has, in particular, a plurality of switching elements.

A "switching element" is intended to be understood to mean an element which is provided to establish and/or to isolate an electrically conductive connection between two points, in particular contacts of the switching element, in particular with a specific resistance of for example at most 0.2 μΩm, advantageously of at most 0.05 μΩm, preferably of at most 0.03 μΩm and particularly preferably of at most 0.02 μΩm at 20° C. Preferably, the switching element has at least one control contact via which it can be switched. In particular, the switching element is configured as a semiconductor switching element, in particular as a transistor, advantageously as a bipolar transistor with a preferably insulated gate electrode (IGBT). Alternatively, the switching element is configured as a mechanical and/or electromechanical switching element, in particular as a relay. For example, at least one switching element could be configured as an on/off switching element. Alternatively or additionally, at least one switching element could be configured as a changeover switch.

"An inverter can be assigned to a phase terminal" is intended to be understood to mean that the inverter can be electrically connected to the phase terminal by means of the switching arrangement. In particular, this is also intended to be understood to mean expediently an assignment in the opposing direction. "An inverter is assigned to a phase terminal" is intended to be understood to mean that the inverter is electrically connected to the phase terminal by means of the switching arrangement. In particular, this is also intended to be understood to mean expediently a connection in the opposing direction.

"Provided" is intended to be understood to mean specifically programmed, designed and/or equipped. An object being provided for a specific function is intended to be understood to mean that the object fulfills and/or carries out this specific function in at least one use state and/or operating state.

It is further proposed that the household appliance apparatus has a third inverter which can be assigned to each of the phase terminals by means of the switching arrangement. In particular, a flexibility can be increased by means of such an embodiment. Advantageously, a number of independent heating zones could be increased by means of such an embodiment. Moreover, in particular, a household appliance apparatus can be provided thereby which, in particular, has a particularly high degree of flexibility regarding possible configurations of items of cookware. Since a user can be provided with a more flexible cooking appliance apparatus, in particular, a user satisfaction can be increased. Moreover, in particular, a cooking experience can be improved.

It is further proposed that the household appliance apparatus has a fourth inverter which can be assigned to each of the phase terminals by means of the switching arrangement. In particular, a flexibility can be further increased by means of such an embodiment. Advantageously, a number of independent heating zones could be further increased by means of such an embodiment. Moreover, in particular, a household appliance apparatus which, in particular, has a further increased flexibility regarding possible configurations of items of cookware can be provided thereby. Since a more flexible cooking appliance apparatus can be provided to the user, in particular a user satisfaction can be increased. Moreover, in particular, a cooking experience can be further improved. For example, it might be conceivable that the household appliance apparatus has a number of inverters, including at least one further inverter, but for example at least two further inverters, advantageously at least three further inverters, particularly preferably at least four further inverters, preferably at least five further inverters, and particularly preferably at least six further inverters, which can be assigned to each of the phase terminals by means of the switching arrangement. It might be conceivable that, for example, at least two of the inverters, advantageously at least four of the inverters, preferably at least six of the inverters and particularly preferably all of the inverters are configured to be at least substantially and preferably entirely identical. Units which are configured to be "at least substantially identical" is intended to be understood to mean that at least 75%, advantageously at least 80%, preferably at least 85%, particularly preferably at least 90% and particularly advantageously at least 95% of all of the components of the units are configured to be identical.

It is further proposed that the household appliance apparatus has a third phase terminal which is provided for electrical connection to a third phase of the power supply network, wherein each of the inverters can be assigned to the third phase terminal by means of the switching arrangement. As a result, in particular, a particularly high power, in particular a particularly high heating power, can be provided. Moreover, in particular, a higher degree of flexibility can be achieved by means of such an embodiment. In particular, a number of inverters operated independently of different phases can be increased thereby, which in particular further increases the flexibility. Since a user can be provided with a more flexible cooking appliance apparatus, in particular, a user satisfaction can be increased.

It is further proposed that the household appliance apparatus has a plurality of heating units which can be assigned in each case to different phase terminals by means of the switching arrangement. As a result, in particular, a particularly high degree of flexibility can be achieved and namely, in particular, regarding possible configurations of items of cookware. Moreover, in particular a high power, in particular a high heating power, and also a high power density, can be achieved by means of such an embodiment. As a result, in particular, an ease of use can be further enhanced. It might be conceivable that to this end the switching arrangement has at least one configuration switch which is arranged, in particular, between the heating units and the inverters and comprises, in particular, at least one assignment switch which is arranged, in particular, between the phase terminals and the inverters. In other words, the household appliance apparatus has a plurality of heating units which can be operated by different phase terminals, i.e. in particular by different phases. It might alternatively or additionally be conceivable that the household appliance apparatus has a plurality of heating units which can be assigned to the same phase terminals by means of the switching arrangement. Also conceivable might be a combination of a plurality of heating units which in each case can be assigned to the same phase terminals by means of the switching arrangement and a plurality of heating units which can be assigned in each case to different phase terminals by means of the switching arrangement. A "heating unit" is intended to be understood to mean a consumer unit having at least one heating element. For example, the heating element could be a consumer which is provided to convert electrical energy into heat. Preferably, the heating unit comprises at least one heating element which is configured as an inductor. An "inductor" is intended to be understood to mean in this case an element which has at least one induction coil and/or which is configured as an induction coil and which is provided in at least one operating state to supply at least one receiving element with energy, in particular in the form of an alternating magnetic field. The receiving element, in particular, is configured as a part and/or a subassembly of a receiving unit and, in particular, is provided for receiving the energy provided by at least one inductor. The receiving unit can be, in particular, part of the household appliance apparatus. Alternatively, it is conceivable that the receiving unit is configured as a unit which is independent of the household appliance apparatus, and/or as part of a further apparatus which is independent of the household appliance apparatus. The receiving unit can be provided, in particular, for positioning on a region above the inductor. The receiving unit could be configured, for example, as an item of cookware and, in particular, have at least one secondary coil as a receiving element for receiving the energy provided by the inductor and/or the further inductor. Alternatively or additionally, the receiving element could also be configured as a metallic heating means, in particular as an at least partially ferromagnetic heating means, for example as a ferromagnetic base of an item of cookware, in which in an operating state of the heating unit eddy currents and/or magnetic reversal effects which are converted into heat can be produced by the inductor.

It is further proposed that at least two of the heating units are configured as bridge heating units which at least partially form a continuous heating zone. In particular, a high degree of flexibility can be achieved by means of such an embodiment. In particular, a particularly large-surfaced heating zone can be made possible by means of such an embodiment. In particular, further configurations of items of cookware, in particular, can be made possible thereby and in particular by using particularly large items of cookware. As a result, an ease of use and/or user satisfaction can also be improved. It might be conceivable that further heating units are configured as bridge heating units which form the one continuous heating zone, at least together with the two heating elements which are configured as bridge heating units. It might be conceivable here that at least three heating units, advantageously four heating units and in particular any other number of heating units, are configured as bridge heating units, which together form one continuous heating zone. It might also be conceivable that the two heating units which are configured as bridge heating units entirely form the continuous heating zone. In other words, it might be conceivable, in particular, that the continuous heating zone is configured entirely from the two heating units. It might be conceivable, in particular, that the household appliance apparatus has, for example, a number of heating units, including at least four heating units, advantageously at least six heating units, particularly advantageously at least eight heating units, preferably at least ten heating units and particularly preferably at least twelve heating units which are configured as bridge heating units and which at least partially form, for example, at least two, advantageously at least three, particularly advantageously at least four, preferably at least five and particularly preferably at least six, continuous heating zones. For example, the bridge heating units could have differently sized radii and, in particular, could be arranged concentrically. Alternatively, the bridge heating units could be arranged adjacently, in particular immediately next to one another.

It is further proposed that the household appliance apparatus has a control unit which in at least one operating state assigns the bridge heating units to different phase terminals by means of the switching arrangement. In particular, a high power can be achieved by means of such an embodiment. In particular, it can be achieved that an independent heating zone is operated by a plurality of phase terminals, whereby in particular a load can be evenly distributed. Moreover, in particular, a service life of the household appliance apparatus can be extended thereby. A "control unit" is intended to be understood to mean an electronic unit which is preferably at least partially integrated in a control and/or regulating unit of the household appliance and which is preferably provided to control and/or to regulate at least the switching arrangement and preferably also the inverters. Preferably, the control unit comprises a computing unit and, in particular, additionally to the computing unit a memory unit with a control and/or regulating program stored therein which is provided to be executed by the computing unit. An "operating state" is intended to be understood to mean a state of the household appliance apparatus in which at least one inverter is operated, in particular for heating items of cookware. In particular, a plurality of operating states are possible which, in particular, differ regarding the assignment of the inverters to phase terminals and/or for example regarding the assignment of heating units to inverters. For example, in one possible operating state the inverter which is operated, for example the first inverter, is assigned to the first phase terminal. In particular, in the operating state in which in particular the first inverter is assigned to the first phase terminal, the second inverter can be assigned to any phase terminal by means of the switching arrangement.

It is further proposed that the switching arrangement has a configuration switching unit, by means of which the first inverter and the second inverter can be connected in parallel for the common supply of at least one heating unit. As a result, a particularly high level of cost efficiency can also be achieved. In particular, a load can be evenly distributed thereby, in particular, and namely in particular to a plurality of inverters. This can, in particular, advantageously lead to a longer service life of the household appliance apparatus. Moreover, in particular, it is made possible by means of such an embodiment to use inverters with, in particular, a lower nominal power. Thus, in particular, a cost efficiency can be further increased thereby. Moreover, in particular, a particularly high level of heating power can be achieved. Since as a result, in particular, a particularly high heating power can be provided to the user, in particular a user satisfaction can also be increased thereby. Moreover, in particular, a higher degree of flexibility can be achieved thereby, in particular regarding a possible power range of heating units. A "configuration switching unit" is intended to be understood to mean an electrical unit which, in particular, is part of the switching arrangement and which is provided in at least one operating state to connect in parallel at least one inverter to at least one further inverter. To this end, the configuration switching unit has, in particular, a plurality of switching elements. In particular, in at least the operating state in which the first inverter and the second inverter are connected in parallel by means of the configuration switching unit of the switching arrangement, the inverters supply the heating unit at the same time with alternating current. Alternatively or additionally, it might be conceivable that the third inverter and the fourth inverter can be connected in parallel by means of the configuration switching unit for the common supply of at least one heating unit. Alternatively or additionally, it might be conceivable that the fifth inverter and the sixth inverter can be connected in parallel by means of the configuration switching unit for the common supply of at least one heating unit. Moreover, alternatively or additionally it might be conceivable, in particular, that any other combination of inverters can be connected in parallel by means of the configuration switching unit for the common supply of at least one heating unit.

It is further proposed that the switching arrangement has, in particular, exactly one isolating switching element which in at least one switched-off operating state isolates all of the connections between the phase terminals and the inverters. As a result, in particular, a particularly high degree of safety can be achieved. In particular, an efficient isolation of all of the electrical connections between the phase terminals and the inverters can be ensured. Moreover, a high level of efficiency, in particular cost efficiency, and namely advantageously regarding a number of components required, can be provided.

It is further proposed that the isolating switching element is directly connected in terms of circuit technology to the second phase terminal. In particular, the isolating switching element is directly connected to the second phase terminal. In other words, in particular, an electrical line between the isolating switching element and the second phase terminal is preferably free of further components. For example, it might be conceivable that the isolating switching element is directly connected in terms of circuit technology to a different phase terminal. As a result, in particular, a high level of efficiency can be achieved. Additionally, in particular, further components can be at least partially dispensed with, which further increases a cost efficiency, in particular.

It is further proposed that the household appliance apparatus has the control unit which in the switched-off operating state assigns all of the inverters to the second phase terminal by means of the switching arrangement and opens the isolating switching element. As a result, in particular, an isolation of all of the electrical connections between the phase terminals and the inverters can be undertaken by means of a single isolating switching element. As a result, in particular, a particularly high level of efficiency, in particular a particularly high level of cost efficiency, can be provided.

In order to improve further a flexibility, in particular, a household appliance, in particular a cooktop, having at least one household appliance apparatus according to the invention, is also proposed.

The invention is also based on a method for operating a household appliance apparatus, in particular a cooktop apparatus, having a first inverter, having a second inverter; having a first phase terminal which is provided for electrical connection to a first phase of a power supply network, and having a second phase terminal which is provided for electrical connection to a second phase of the power supply network.

It is proposed that a decision is made as a function of an operating state as to which inverter is assigned to which of the phase terminals.

The household appliance apparatus, the household appliance and the method for operating the household appliance apparatus are not intended to be limited in this case to the above-described application and embodiment. In particular, the household appliance apparatus, the household appliance and the method for operating the household appliance apparatus can have a number of individual elements, components, units and method steps which is different from a number mentioned herein, for fulfilling a mode of operation described herein.

Further advantages emerge from the following description of the drawing. Exemplary embodiments of the invention are shown in the drawing. The drawing, the description and the claims contain numerous features in combination. The person skilled in the art will expediently also consider the features individually and combine them together to form further meaningful combinations.

DETAILED DESCRIPTION OF EXEMPLARY EMBODIMENTS OF THE PRESENT INVENTION

Of the objects which are repeatedly present, only one is provided in each case with a reference sign in the figures.

Figure 1:
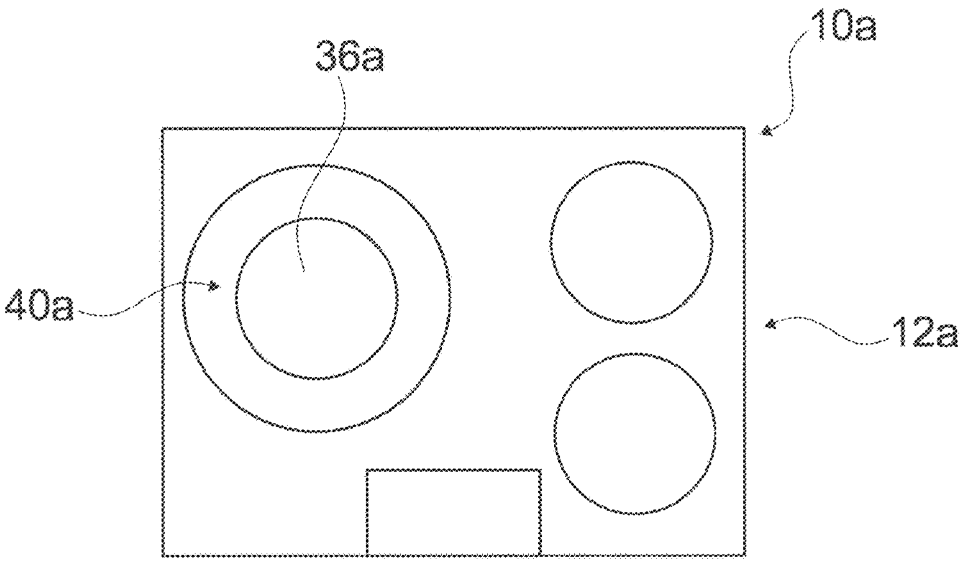
FIG. 1 shows a cooktop having a household appliance apparatus which is configured as a cooktop apparatus, in a simplified plan view.
Figure 2:
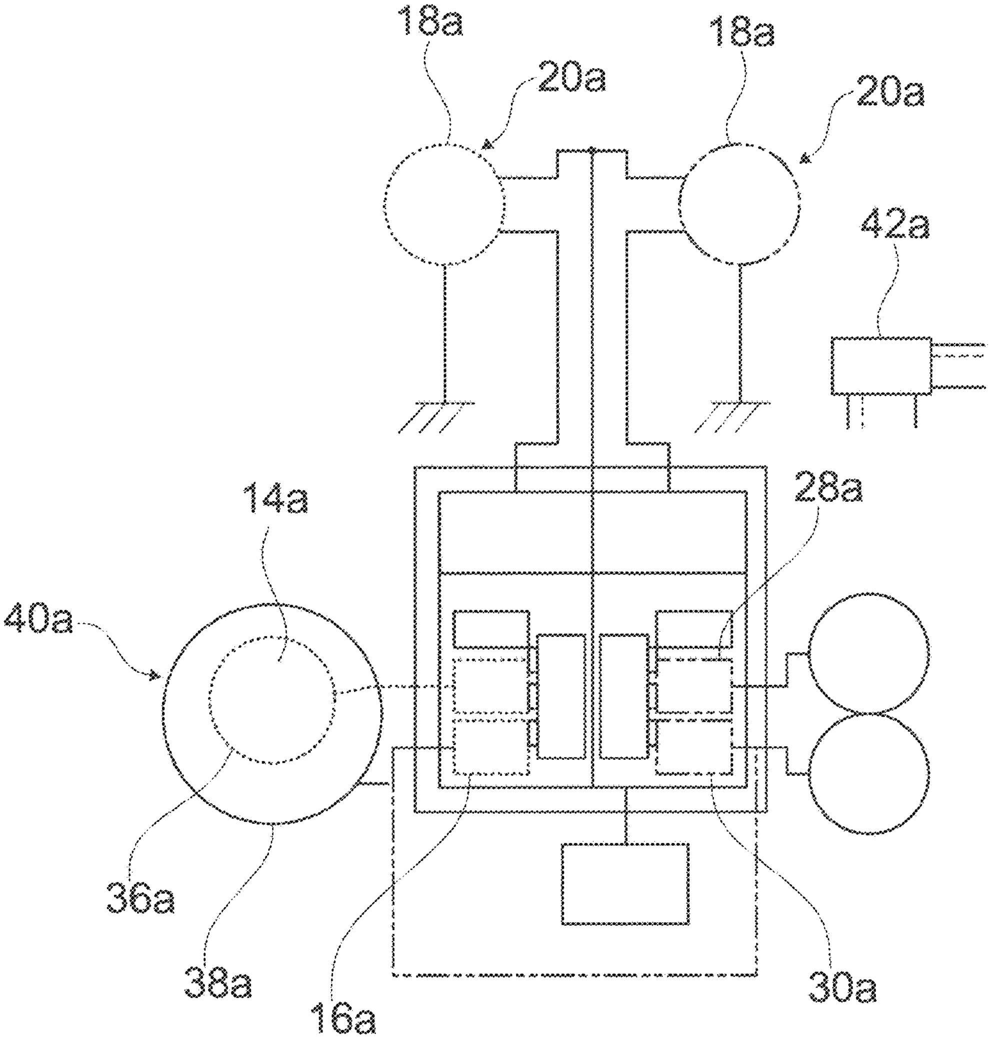
FIG. 2 shows a simplified view of the household appliance apparatus having a first phase terminal and having a second phase terminal.
Figure 3:
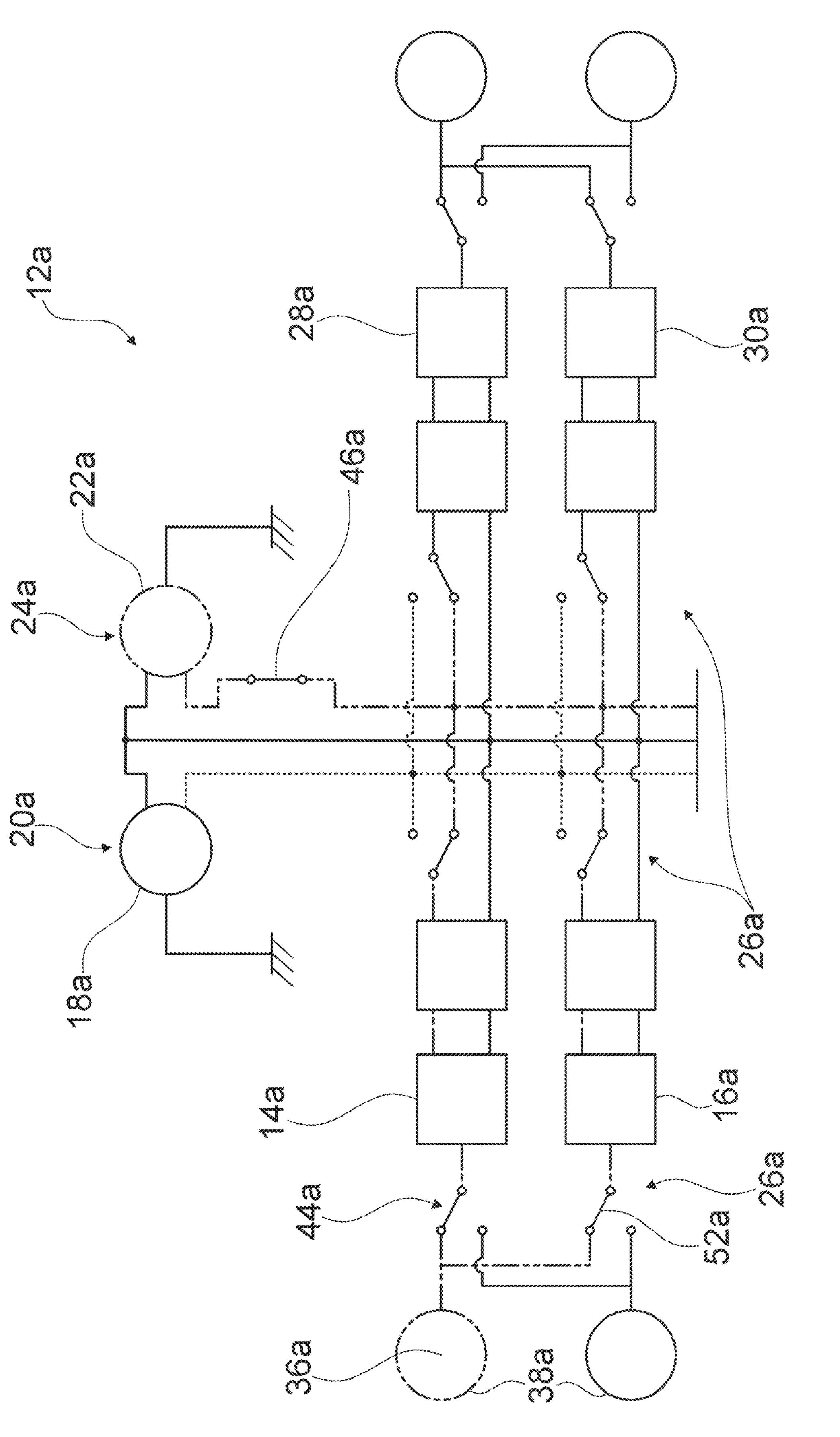
FIG. 3 shows a circuit diagram of a part of the household appliance apparatus with a switching arrangement in an operating state.

FIG. 1 shows a household appliance **10*a***, in particular a cooking appliance, which is configured as a cooktop, in particular as an induction cooktop.

In the example shown, the household appliance **10*a*, which is configured as a cooktop, has a household appliance apparatus 12*a*** which is configured as a cooktop apparatus. In the example shown, the cooktop apparatuses are configured as induction cooktop apparatuses.

In particular, in FIGS. 2 to 6 parts of the household appliance apparatus **12*a*** are shown in more detail with reference to a schematic illustration and/or circuit diagram.

The household appliance apparatus **12*a* has a first inverter 14*a*. Additionally, the household appliance apparatus 12*a* has a second inverter 16*a*. In the example shown, the household appliance apparatus 12*a* additionally has a third inverter 28*a*. In the example shown, the household appliance apparatus 12***a* additionally has a fourth inverter 30*a*. Additionally, the household appliance apparatus 12*a* has a control unit 42*a*.

Moreover, the household appliance apparatus 12*a* has a first phase terminal 18*a*. The first phase terminal 18*a* is provided for electrical connection to a first phase 20*a* of a power supply network.

Moreover, the household appliance apparatus 12*a* has a second phase terminal 22*a*. The second phase terminal 22*a* is provided for electrical connection to a second phase 24*a* of the power supply network.

Additionally, the household appliance apparatus 12*a* has a switching arrangement 26*a*. Each of the inverters 14*a*, 16*a*, 28*a*, 30*a* is assigned to each of the phase terminals 18*a*, 22*a* by means of the switching arrangement 26*a*.

Moreover, the household appliance apparatus 12*a* has a plurality of heating units 36*a*. All of the heating units are configured as induction heating units in the example shown.

The switching arrangement 26*a* has a configuration switching unit 44*a*. The configuration switching unit 44*a* comprises a plurality of configuration relays 52*a*.

The first inverter 14*a* and the second inverter 16*a* can be connected in parallel by means of the configuration switching unit 44*a* of the switching arrangement 26*a* for the common supply of at least one heating unit 36*a*.

Additionally, the third inverter 28*a* and the fourth inverter 30*a* can be connected in parallel by means of the configuration switching unit 44*a* of the switching arrangement 26*a* for the common supply of at least one heating unit 36*a*. However, the heating units 36*a* could also be directly connected to the inverters 14*a*, 16*a*, 28*a*, 30*a*, for example.

The heating units 36*a* can be assigned in each case to different phase terminals 18*a*, 22*a* by means of the switching arrangement 26*a*.

Figure 4:
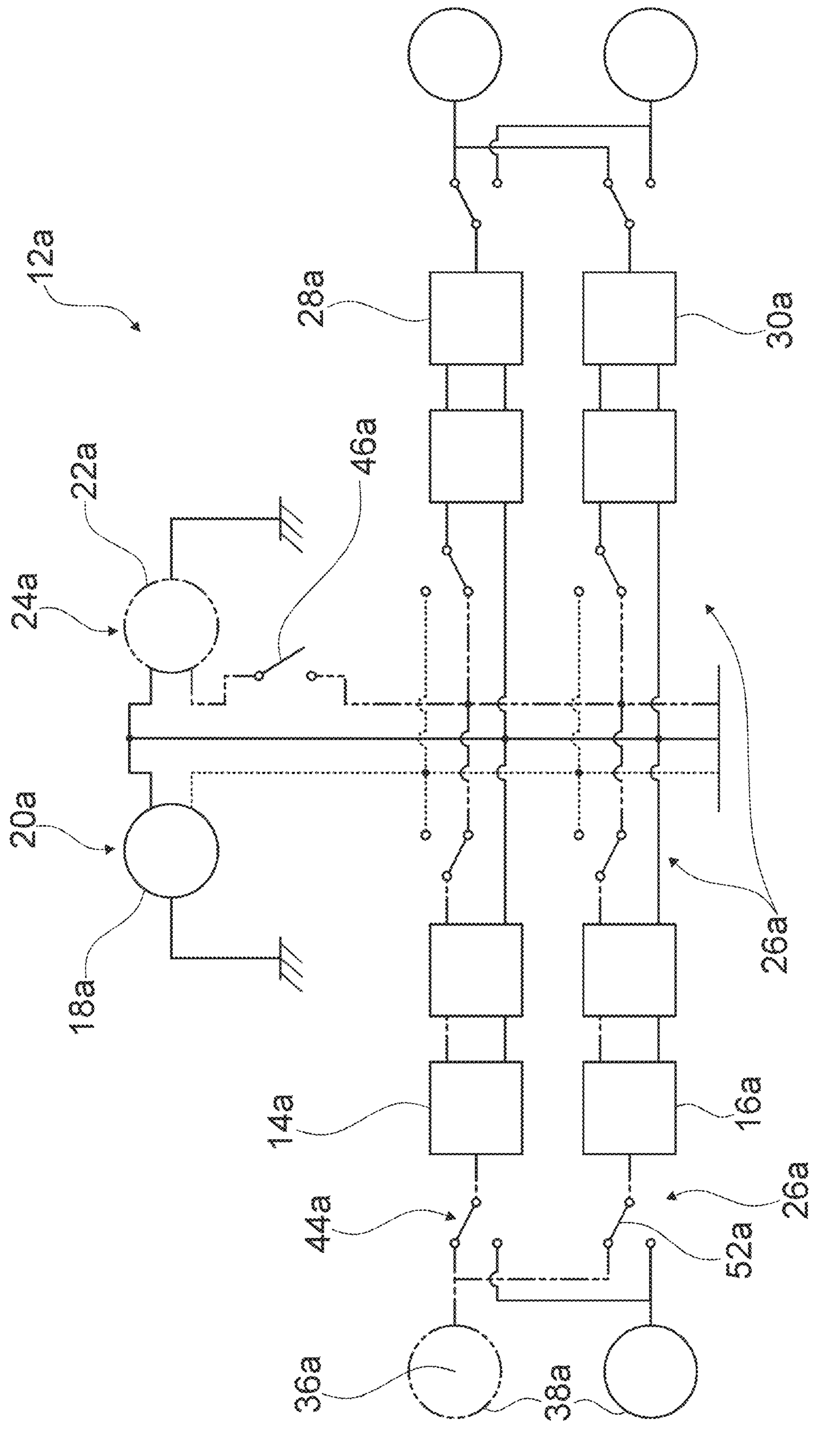
FIG. 4 shows a circuit diagram of the part of the household appliance apparatus with the switching arrangement in a switched-off operating state.
Figure 5:
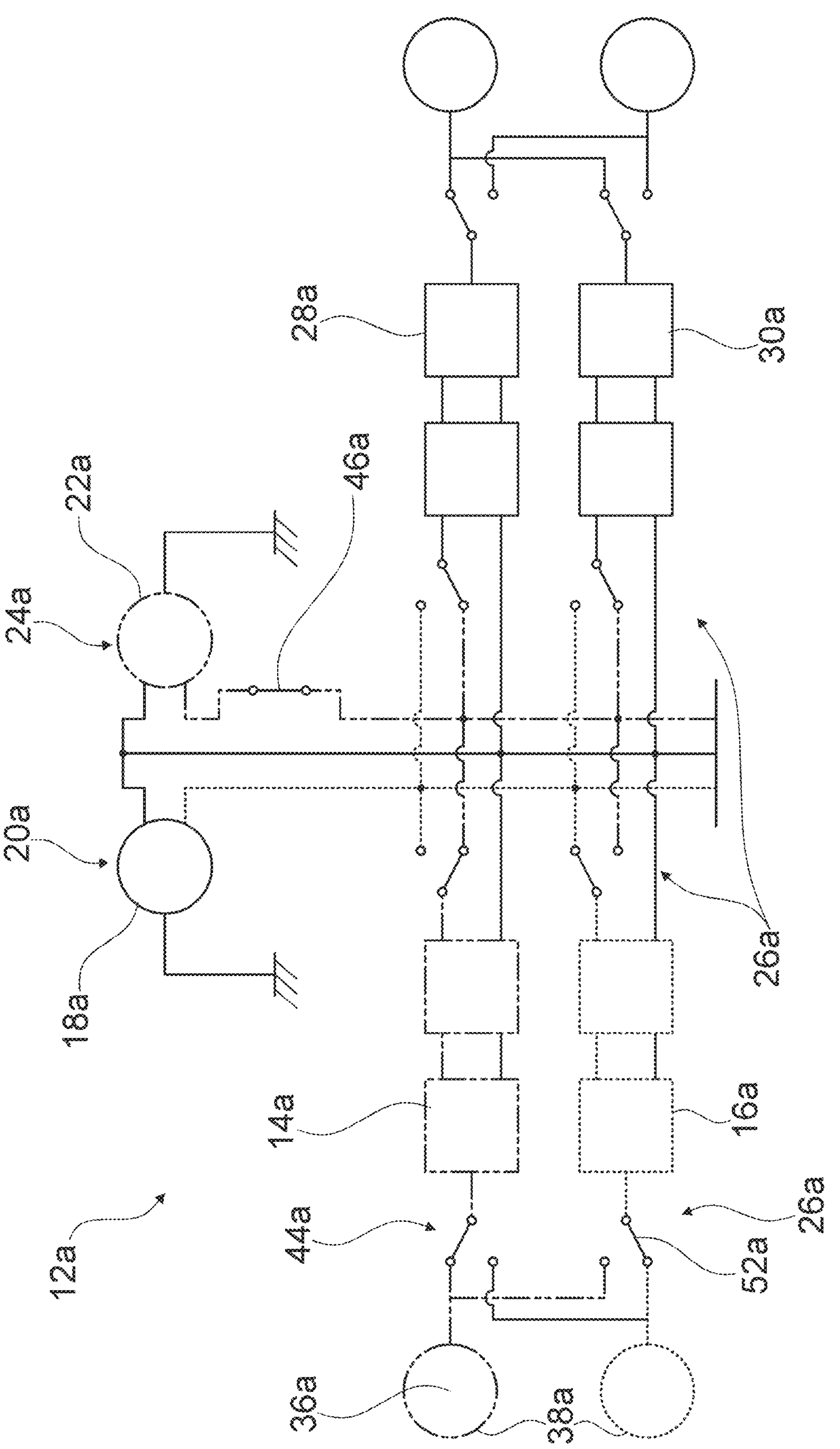
FIG. 5 shows a circuit diagram of the part of the household appliance apparatus with the switching arrangement in a further operating state, FIGS. ***6a*-*6i* show various exemplary possibilities of continuous heating zones of the household appliance apparatus.
Figure 6A:
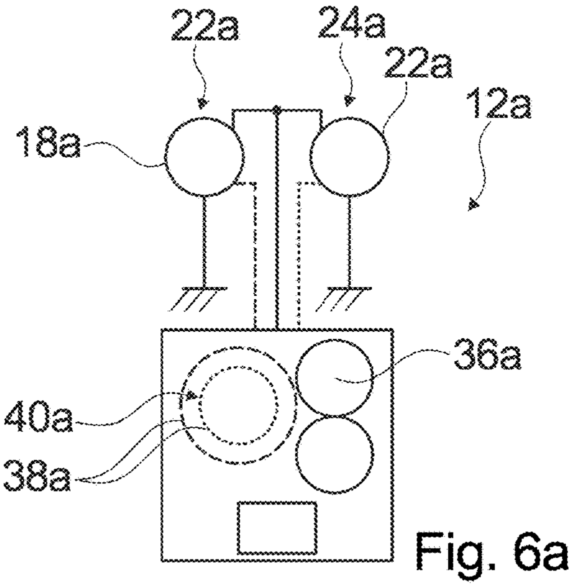
Figure 6B:
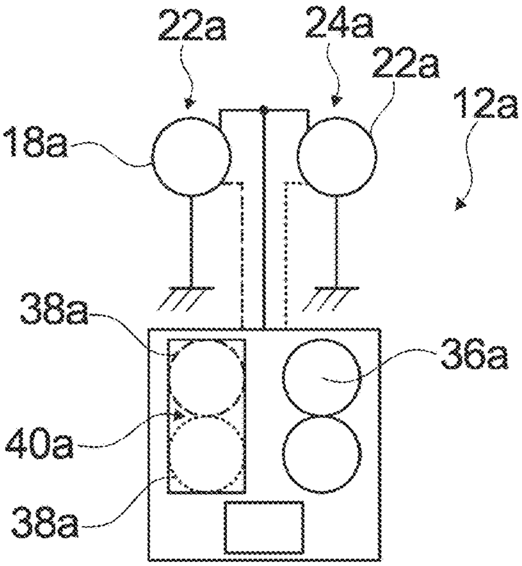
Figure 6C:
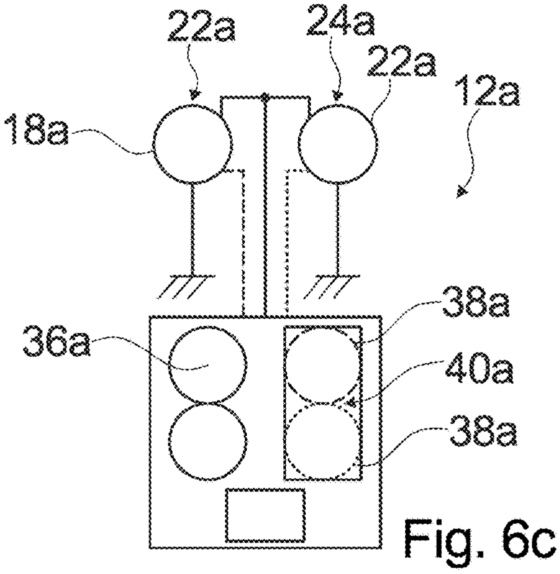
Figure 6D:
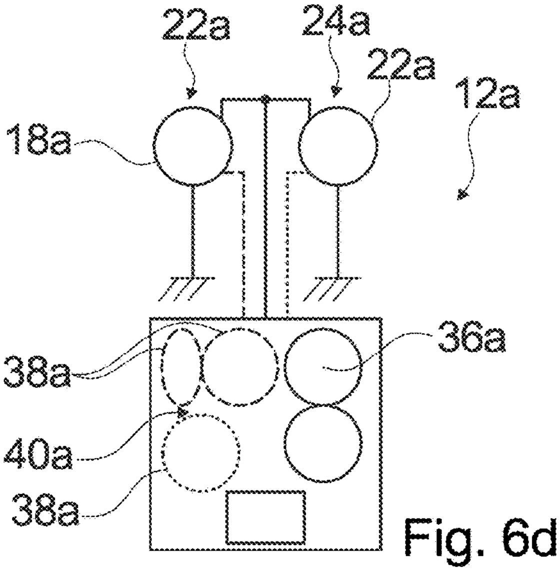
Figure 6E:
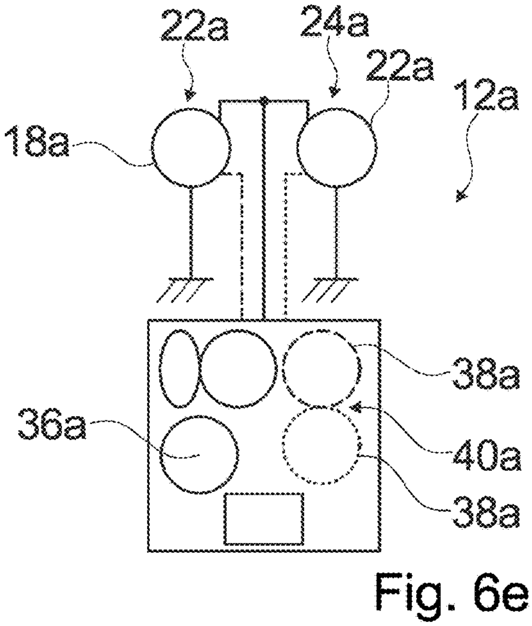
Figure 6F:
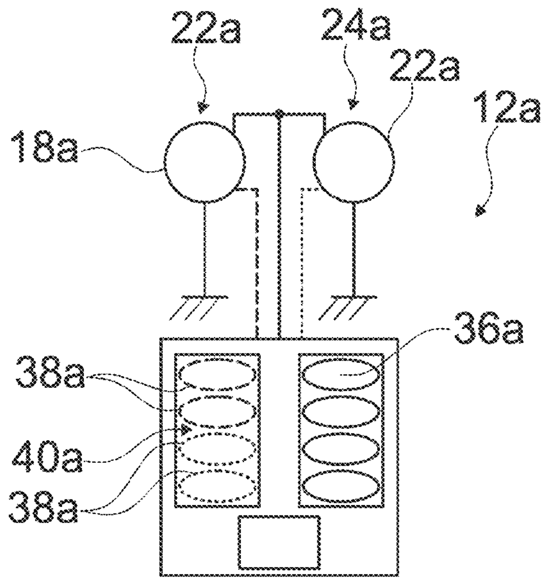
Figure 6G:
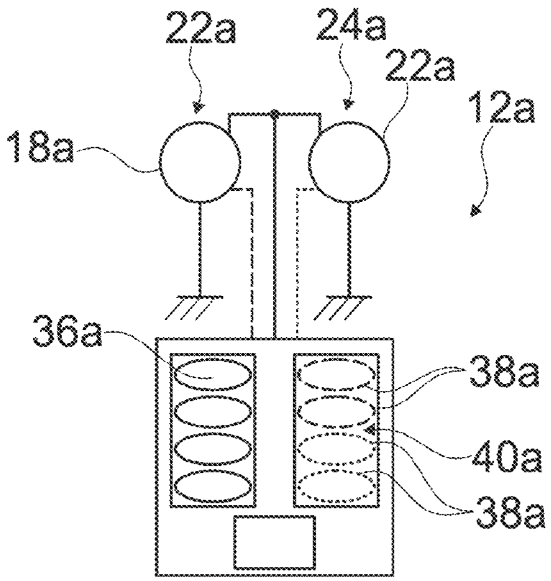
Figure 6H:
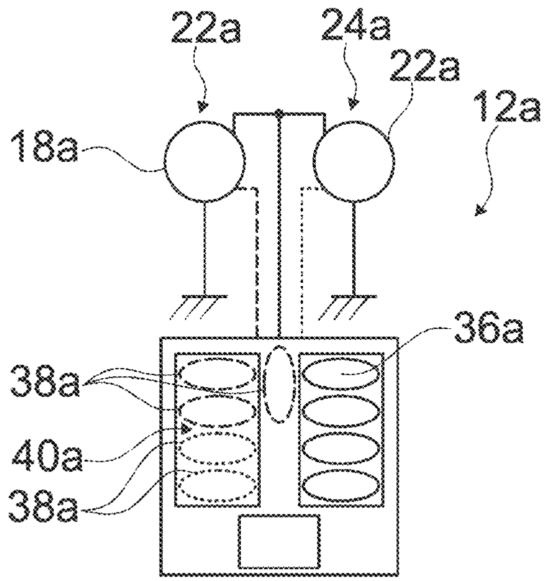
Figure 6I:
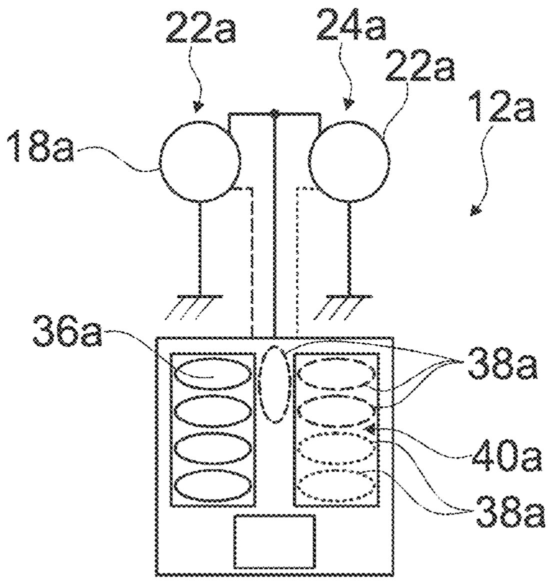

FIG. 4 shows in a circuit diagram the household appliance apparatus 12*a* in a switched-off operating state. In the switched-off operating state, the control unit 42*a* assigns all of the inverters 14*a*, 16*a*, 28*a*, 30*a* to the second phase terminal 22*a* by means of the switching arrangement 26*a*.

Moreover, the switching arrangement 26*a* has exactly one isolating switching element 46*a*. The isolating switching element 46*a* is connected in terms of circuit technology directly to the second phase terminal 22*a*. In other words, no further component is arranged in terms of circuit technology between the isolating switching element 46*a* and the second phase terminal 22*a*.

In the switched-off state, the control unit 42*a* opens the isolating switching element 46*a*. Thus in the switched-off operating state the isolating switching element 46*a* isolates all of the connections between the phase terminals 18*a*, 22*a* and the inverters 14*a*, 16*a*, 28*a*, 30*a*.

In the example shown, two of the heating units 36*a* are configured as bridge heating units 38*a* (see FIGS. 1 to 5). The two heating units 36*a* which are configured as bridge heating units 38*a* form a continuous heating zone 40*a*.

In at least one operating state the control unit 42*a* assigns the bridge heating units 38*a* to various phase terminals 18*a*, 22*a* by means of the switching arrangement 26*a* and namely, in particular, as a function of an operating state of the household appliance apparatus 12*a*.

FIGS. 6*a*-6*i* show various options of continuous heating zones 40*a* in different operating states of the household appliance apparatus 12*a*, to be understood by way of example. The various possible continuous heating zones 40*a* are at least partially formed by at least two heating units 36*a* in each case. The respective assignment of the heating units 36*a* to the respective phase terminals 18*a*, 22*a* is illustrated using different lines.

Figure 7:
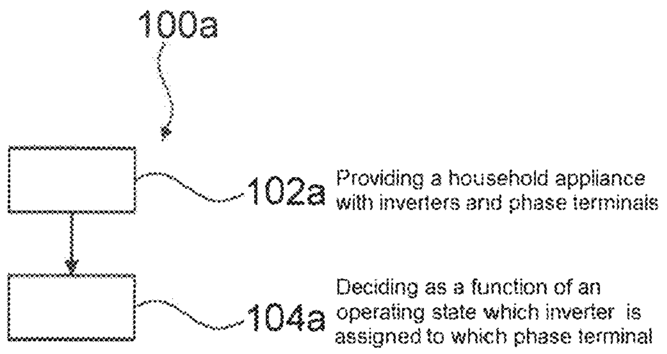
FIG. 7 shows a flow diagram of a method for operating the household appliance apparatus and FIG. 8** shows a circuit diagram of a part of a further exemplary embodiment of a household appliance apparatus with a third phase terminal.

FIG. 7 shows a flow diagram of a method 100*a* for operating the household appliance apparatus 12*a*. In particular, the method 100*a* is provided for operating the household appliance apparatus 12*a* which is configured as a cooktop apparatus.

The method 100*a* has, in particular, a first method step 102*a* and, in particular, a further method step 104*a*.

In the first method step 102*a*, the household appliance apparatus 12*a* is provided, said household appliance apparatus having the first inverter 14*a*, having the second inverter 16*a*; having the first phase terminal 18*a* which is provided for electrical connection to the first phase 20*a* of the power supply network, and having the second phase terminal 22*a* which is provided for electrical connection to the second phase 24*a* of the power supply network.

In the further method step 104*a*, a decision is made as a function of an operating state as to which inverter 14*a*, 16*a* is assigned to which of the phase terminals 18*a*, 22*a*. In particular, in the further method step 104*a* a decision is automatically made as a function of an operating state as to which inverter 14*a*, 16*a* is assigned to which of the phase terminals 18*a*, 22*a*.

Figure 8:
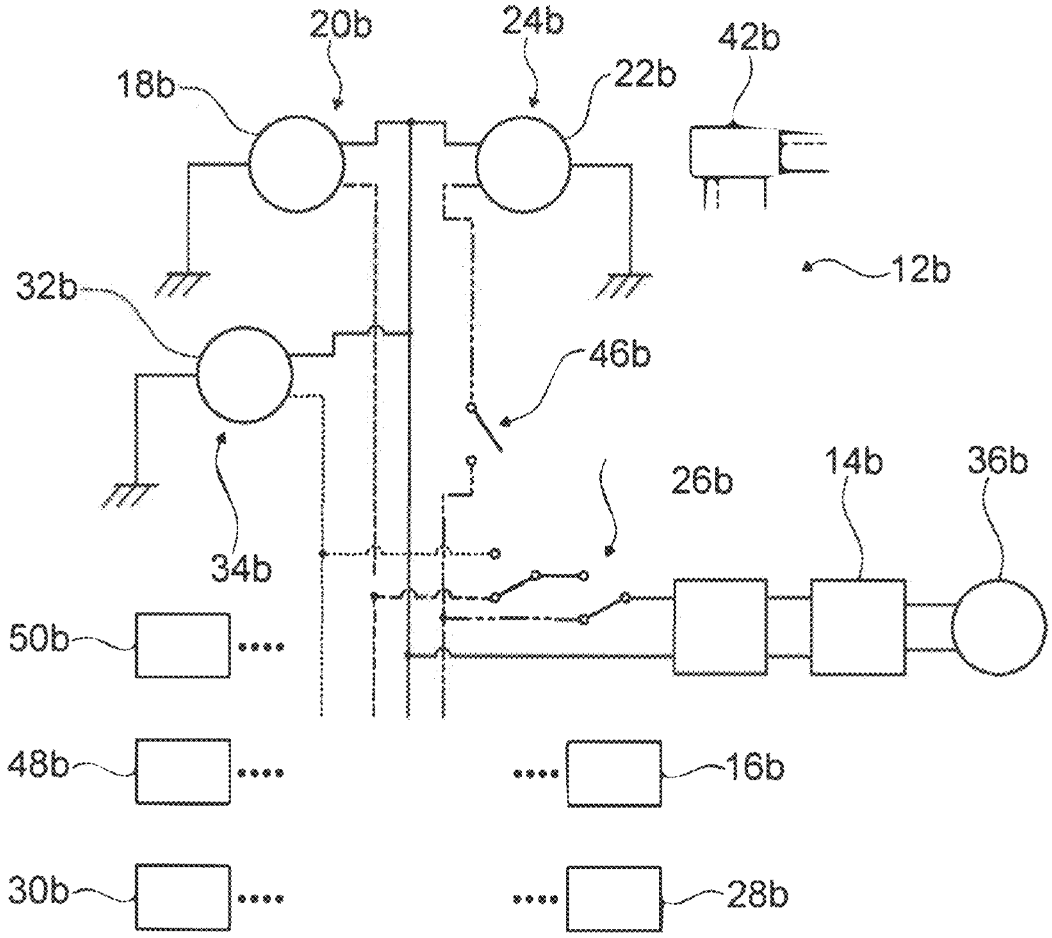

In FIG. 8 a further exemplary embodiment of the invention is shown. The following descriptions are substantially limited to the differences between the exemplary embodiments, wherein relative to components, features and functions remaining the same, reference can be made to the description of the exemplary embodiment of FIGS. 1 to 7. For differentiating between the exemplary embodiments the letter a in the reference signs of the exemplary embodiments of FIGS. 1 to 7 is replaced by the letter b in the reference signs of the exemplary embodiment of FIG. 8. Relative to components denoted the same, in particular relative to components provided with the same reference signs, in principle reference can also be made to the drawings and/or the description of the exemplary embodiment of FIGS. 1 to 7.

In particular, a part of a further exemplary embodiment of a household appliance apparatus 12*b*, in particular a cooktop apparatus, is shown in FIG. 8.

The household appliance apparatus 12*b* has a third phase terminal 32*b*. The third phase terminal 32*b* is provided for electrical connection to a third phase 34*b* of the power supply network.

The household appliance apparatus 12*b* has a switching arrangement 26*b*. The household appliance apparatus 12*b* has a first inverter 14*b*. Additionally, the household appliance apparatus 12*b* has a second inverter 16*b*. Additionally, the household appliance apparatus 12*b* has a third inverter 28*b*. Additionally, the household appliance apparatus 12*b* has a fourth inverter 30*b*. Additionally, by way of example the household appliance apparatus 12*b* has a fifth inverter 48*b*. Additionally, by way of example the household appliance apparatus 12*b* has a sixth inverter 50*b*. For the sake of improved clarity, in FIG. 8 a terminal is shown in a circuit diagram with reference to the first inverter 14*b*. Each of the inverters 14*b*, 16*b*, 28*b*, 30*b*, 48*b*, 50*b* is assigned to the third phase terminal 32*b* by means of the switching arrangement 26*b*.

The invention claimed is:

1. A household appliance apparatus, comprising:

a first inverter;

a second inverter;

a first phase terminal designed for electrical connection to a first phase of a power supply network;

a second phase terminal designed for electrical connection to a second phase of the power supply network; and a switching arrangement configured to assign each of the first and second inverters to each of the first and second phase terminals, wherein the switching arrangement includes a configuration switching unit configured to connect the first inverter and the second inverter in parallel for a common supply of one of a plurality of heating units.

2. The household appliance apparatus of claim 1, constructed in a form of a cooktop apparatus.

3. The household appliance apparatus of claim 1, further comprising a third inverter, said switching arrangement configured to assign the third inverter to each of the first and second phase terminals.

4. The household appliance apparatus of claim 1, further comprising a fourth inverter, said switching arrangement configured to assign the fourth inverter to each of the first and second phase terminals.

5. The household appliance apparatus of claim 1, further comprising a third phase terminal designed for electrical connection to a third phase of the power supply network, said switching arrangement configured to assign each of the first and second inverters to the third phase terminal.

6. The household appliance apparatus of claim 1, further comprising a plurality of heating units, said switching arrangement configured to assign the plurality of heating units to different ones of the first and second phase terminals.

7. The household appliance apparatus of claim 6, wherein at least two of the plurality of heating units are configured as bridge heating units which at least partially form a continuous heating zone.

8. The household appliance apparatus of claim 7, further comprising a control unit configured to assign in at least one operating state the bridge heating units to different ones of the first and second phase terminals via the switching arrangement.

9. The household appliance apparatus of claim 1, wherein the switching arrangement includes an isolating switching element configured to isolate in at least one switched-off operating state all connections between the first and second phase terminals and the first and second inverters.

10. The household appliance apparatus of claim 9, wherein the isolating switching element is directly connected in terms of circuit technology to the second phase terminal.

11. The household appliance apparatus of claim 9, further comprising a control unit configured to assign in the switched-off operating state all of the first and second inverters to the second phase terminal via the switching arrangement and to open the isolating switching element.

12. The household appliance apparatus of claim 1, wherein the switching arrangement includes exactly one isolating switching element configured to isolate in at least one switched-off operating state all connections between the first and second phase terminals and the first and second inverters.

13. The household appliance apparatus of claim 1, further comprising a plurality of heating units, wherein the configuration switching unit is configured to connect, in a first operating state, a first heating unit of the plurality of heating units to the first inverter and assign a second heating unit of the plurality of heating units to the second inverter, and the configuration switching unit is configured to connect, in a second operating state, the first heating unit of the plurality of heating units to the first inverter and the second inverter.

14. A household appliance, comprising a household appliance apparatus, said household appliance apparatus comprising a first inverter, a second inverter, a first phase terminal designed for electrical connection to a first phase of a power supply network, a second phase terminal designed for electrical connection to a second phase of the power supply network, and a switching arrangement configured to assign each of the first and second inverters to each of the first and second phase terminals, wherein the switching arrangement includes a configuration switching unit configured to connect the first inverter and the second inverter in parallel for a common supply of one of a plurality of heating units.

15. The household appliance of claim 14, constructed in a form of a cooktop.

16. The household appliance of claim 14, further comprising a plurality of heating units, wherein the configuration switching unit is configured to connect, in a first operating state, a first heating unit of the plurality of heating units to the first inverter and assign a second heating unit of the plurality of heating units to the second inverter, and the configuration switching unit is configured to connect, in a second operating state, the first heating unit of the plurality of heating units to the first inverter and the second inverter.

17. A method for operating a household appliance apparatus which comprises a first inverter, a second inverter; a first phase terminal designed for electrical connection to a first phase of a power supply network, and a second phase terminal designed for electrical connection to a second phase of the power supply network, the method comprising deciding as a function of an operating state as to which of the first and second inverters is assigned to which of the first and second phase terminals, and switching a configuration switching unit of the switching arrangement to connect the first inverter and the second inverter in parallel for a common supply of one of a plurality of heating units.

18. The method of claim 17 for operating a cooktop apparatus.

19. The method of claim 17, wherein the configuration switching unit is configured to connect, in a first operating state, a first heating unit of the plurality of heating units to the first inverter and assign a second heating unit of the plurality of heating units to the second inverter, and the configuration switching unit is configured to connect, in a second operating state, the first heating unit of the plurality of heating units to the first inverter and the second inverter.

* * * * *